United States Patent [19]

Hirose

[11] 4,311,103
[45] Jan. 19, 1982

[54] INCINERATION SYSTEM FOR SEWAGE SLUDGE

[76] Inventor: Yasuo Hirose, 801-88, Kanagaya, Asahi-ku, Yokohoma City, Kanagawa, Japan

[21] Appl. No.: 147,411

[22] Filed: May 6, 1980

[30] Foreign Application Priority Data

| May 16, 1979 | [JP] | Japan | 74059072 |
| May 16, 1979 | [JP] | Japan | 74059073 |
| May 16, 1979 | [JP] | Japan | 74059074 |
| Mar. 7, 1980 | [JP] | Japan | 50027986 |

[51] Int. Cl.³ .................................... F23G 7/04
[52] U.S. Cl. .................... 110/238; 110/221; 110/224; 110/346
[58] Field of Search ............. 110/238, 245, 244, 221, 110/224, 225, 211, 346

[56] References Cited

U.S. PATENT DOCUMENTS

| 2,148,447 | 2/1939 | Dundas et al. | 110/224 |
| 3,677,404 | 7/1972 | Staffin | 110/221 |
| 3,897,739 | 8/1975 | Goldbach | 110/248 |
| 3,921,544 | 11/1975 | Reese | 110/245 |
| 4,182,246 | 1/1980 | Lombana et al. | 110/346 |
| 4,194,454 | 3/1980 | Lalanne et al. | 110/346 |
| 4,213,407 | 7/1980 | Headley | 110/238 |
| 4,245,570 | 1/1981 | Williams | 110/238 |

Primary Examiner—Henry C. Yuen
Attorney, Agent, or Firm—Beveridge, DeGrandi, Kline & Lunsford

[57] ABSTRACT

The incineration system consists of a sludge dryer, a cyclone separator unit, an incomplete combustion incinerator, a complete combustion incinerator with a heat exchanger, a heat exchanger and so forth and comprises gas circulation passage involving the units above in order to burn sewage sludge economically without any additional fuel except for starting up thereof, with stable heat balancing in spite of change in fed sludge rate and with reduced NOx in the exhaust gas from the incineration system.

5 Claims, 9 Drawing Figures

INCINERATION SYSTEM FOR SEWAGE SLUDGE

BACKGROUND

The environmental protection problem is now one of the most important issues. In this connection, many sewage purification facilities have recently and will nearly been installed all over the world and excess sludge produced in these facilities has to be handled economically due to the uprising fuel cost. Further, the exhaust gas discharged from sludge burning apparatus must been cleaned by removing dust and by minimizing SOx and/or NOx.

This invention was made to cope with these problems.

PRINCIPLE OF INVENTION

This invention relates to an incineration system of sludge discharged from a waste water purification plant. Conventionally, incineration of general sewage sludge was carried out by a combustion furnace with a fluidized sand bed. That is, a perforated bed plate was provided in the combustion furnace, a sand layer with required thickness stable against heating was laid on the bed plate, the sand was always kept fluidized by feeding hot air from under the said perforated bed plate, sewage sludge is supplied onto the said fluidized sand layer and the sewage sludge was pulverized and burnt by the said fluidized sand. For the incineration of sewage sludge with this method, it is necessary to always maintain a temperature in the furnace to 650° C. or more and should the temperature be lowered below 650° C., bad smell would inevitably be generated.

Though sewage sludge fed to the invented incineration system is previously dehydrated to a water content of up to about 70 percent, the dehydrated sludge is very viscous and it is actually impossible to feed such sludge to any combustion furnace at a constant rate. Namely, it is fed at random in such a way as sometimes at a layer or at a small rate. It has been found that the sand might be extremely consumed and be reduced by 10 percent a month if the sand would be fluidized actively to cope with the random supply.

The invented system is an incineration apparatus to eliminate the defects stated above, and in addition, is intended to reduce NOx rate in the exhaust gas as well as to save fuel consumption because combustion is almost performed by a calorific value which is provided with sewage sludge itself.

The invented incineration system is designed to use the conventional combustion furnace as a drying furnace in the first process, sewage sludge is dried in the drying furnace under atmosphere about 350° C. and to allow the dried sewage sludge to circulate through a circular feed pipe circuit. A heat exchanger is provided for this circuit to allow a portion of the dried gas of the sewage sludge to receive heat from combustion exhaust gas to elevate a temperature of the former gas to 350° through 400° C., and the former gas is returned again to the drying furnace as gas for drying sewage sludge. In addition, an incomplete and a complete combustion incinerators are provided; the incomplete combustion incinerator receives the dried sewage sludge produced by the said drying furnace and a portion of the dried gas of the sewage sludge from the said circular circuit to burn the dried sewage sludge incompletely by providing a preheated air supply at a rate for combustion less than the theoretical combustion air rate, namely by allowing an insufficient air condition to suppress NOx and/or hexachrom oxide generation. The complete combustion incinerator receives the incomplete combustion product of the said incomplete combustion incinerator and a portion of the dried gas of the sewage sludge extracted from the said circular circuit, allowing both to be burnt completely under atmosphere about 800° C. by supplying preheated air for combustion and permits the discharge of the exhaust gas after the bad smell component thereof is decomposed perfectly. Further, this incineration system can greatly reduce any bad effect by using the drying furnace and the incomplete and the complete combustion incinerators as such, should supply of sewage sludge be at random and if, because of this, a temperature in the drying furnace should somewhat be raised or lowered.

Figure 1:
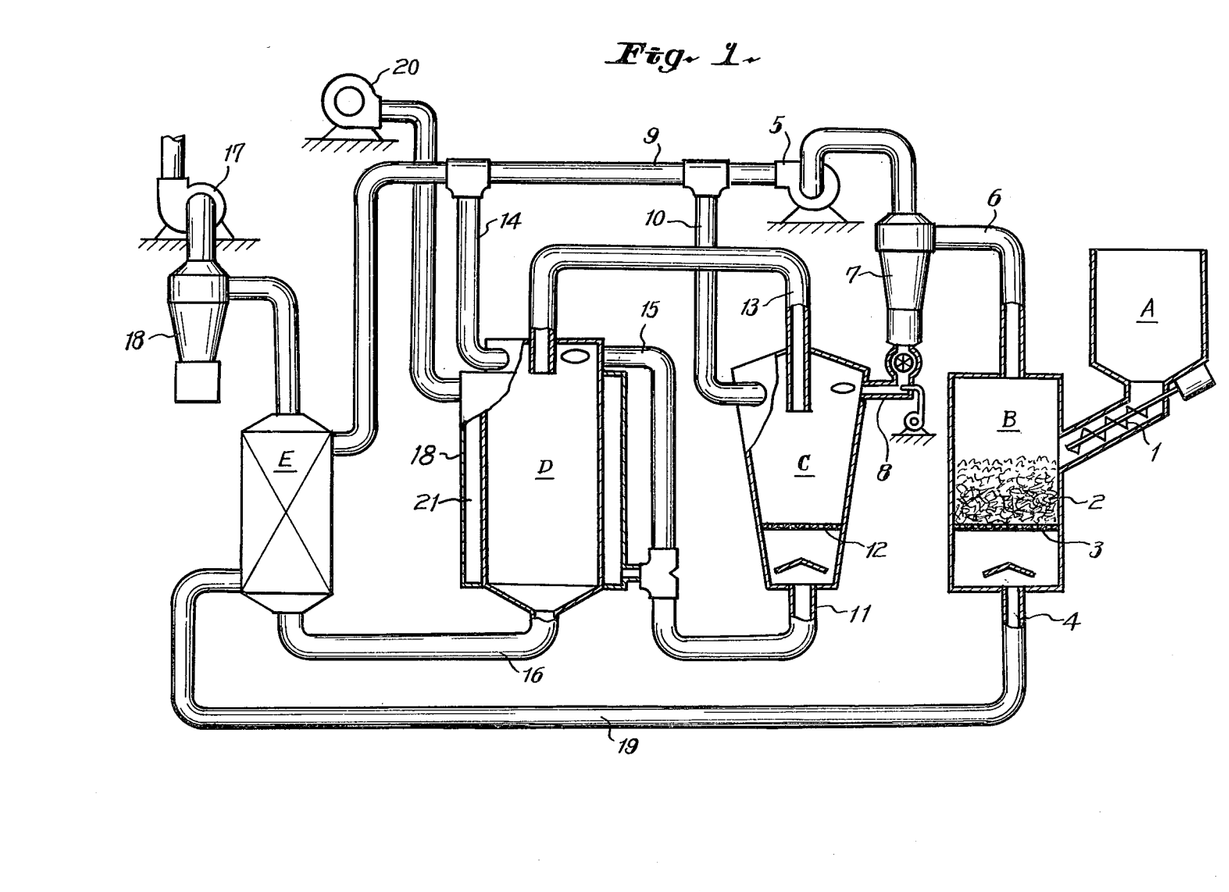
FIG. 1 is the explanation drawing of the invented incinerator system for sewage sludge.

DESCRIPTION OF ATTACHED DRAWINGS:

FIG. 1 shows the embodied example of the sewage sludge incineration system that has been invented by the inventor and has been applied to Japanese Patent Office as to be patented (dated May 16, 1979; filed No. Sho 54-059072). We describe the embodied example further in detail in accordance with FIG. 1:

In the FIG. 1, sewage sludge previously dehydrated to water content about 70 percent is accommodated in hopper A. Supply means 1 is mounted on the bottom of the said hopper to supply the sewage sludge at an approximately constant rate onto fluidized sand bed 2 in drying furnace B. Gas for drying the sewage sludge, heated to 350°–400° C., is fed through feed pipe 4 from under perforated plate 3 composing the bottom of the said fluidized sand bed. Because of this, the sand layer is actively fluidized, thus the sewage sludge is pulverized and dried at the same time, and while the dried product is kept at a temperature about 120° C., in which no water vapor becomes any droplet, is sucked through feed pipe 6 having blower 5 installed above drying furnace B. A solid separation means, for example, cyclone separator 7 is provided for feed pipe 6. The dried sewage sludge solid separated by cyclone separator 7 is recovered in a chamber mounted on the bottom of cyclone separator 7 and is supplied to incomplete combustion incinerator C at a constant rate per hour by constant rate supply means 8 mounted on the bottom of the said chamber. Branch pipe 10 is provided for feed pipe 9, which is an extension of feed pipe 6 feeding the dried gas of the sewage sludge, and is also the discharge pipe of blower 5. Through the said branch pipe 10, a portion of the dried gas of the sewage sludge is also supplied to incomplete combustion incinerator C.

Preheated air feed pipe 11 is mounted on the bottom of the said incomplete combustion incinerator C, through which preheated air corresponding to 60-95% of the theoretical air rate required for burning the dried gas and solid sewage sludge fed to the said incomplete combustion incinerator is also supplied to the same incinerator. The preheated air is injected upward through perforated plate 12 in the said incomplete combustion incinerator and allows the dried sewage sludge to make incomplete combustion under insufficient air supply.

Feed pipe 13 is mounted on the top of the said incomplete combustion incinerator and the incomplete combustion product produced by the incomplete combustion incinerator C are supplied to complete combustion incinerator from the top thereof through the said feed pipe 13.

Branch pipe 14 is fitted to feed pipe 9 for the dried gas of the sewage sludge, and another portion of the dried gas is supplied to complete combustion incinerator through the said branch pipe 14.

Further, preheated air feed pipe 15 is provided and connected to the said complete combustion incinerator D at an exhaust opening thereof. The preheated air is provided at a rate sufficient to burn the incomplete combustion product and another portion of the dried gas, both supplied to the said complete combustion incinerator. The said complete combustion incinerator D is designed to allow their complete combustion under atmosphere about 800° C. in the said incinerator D.

Discharge pipe 16 is mounted on the bottom of the said complete combustion incinerator, the said discharge pipe 16 has a blower at the tail end thereof, and therefore, the complete combustion products in the said secondary incinerator D are sucked and transferred. Heat exchanger E and a means to separate solid material, for example, cyclone separator 18 are provided for midway between the said discharge pipe 16 are blower 17.

Heat is exchanged between the complete combustion products through discharge pipe 16 and the rest of the dried gas of the sewage sludge (the other portions of which have already been distributed to incomplete and complete combustion incinerators C and D) by heat exchanger E. The gas is elevated in temperature up to about 400° C. and is transferred through gas feed pipe 19, which is connected with feed pipe 4 so that the gas is returned to drying furnace B to be used as drying gas.

The complete combustion products from complete combustion incinerator which has been lowered in temperature by heat exchanger E is sent to blower 17, after a portion of solid material, namely, ash has been removed by solid separation means 18 and is discharged to the atmosphere by the said blower 17 without harm.

The air for combustion to be supplied to incomplete and complete combustion incinerators C and D comes from blower 20 and is dividedly fed to preheated air supply pipes 11 and 15 respectively after the combustion air is preheated through an air preheater incorporated with complete combustion incinerator D, for example, through jacket 18 thereof, or if required, through an air preheater of incomplete combustion incinerator C.

FIG. 1 gives only the important elements composing this invention, that is, hopper A, drying furnace B with the fluidized sand bed, incomplete and complete combustion incinerators C and D, heat exchanger E and the gas feed pipes, etc. showing their relationship and eliminates control valves and devices to adjust respective quantities and/or temperatures. The drying furnace as well as each incinerator must be allowed to elevate in temperatures especially at their starting time until each unit reaches a certain constant temperature by burning fuel with a burner provided for each, however, these are also eliminated for clarity.

The invented incineration system for sewage sludge is featured so that sewage sludge in hopper A is supplied to drying furnace B with a fluidized sand bed by feed means 1, the dried sewage sludge product is partially distributed to incomplete and complete combustion incinerators C and D while the product is transferred through feed pipe 9, the rest is heated through heat exchanger E, is returned again to drying furnace B to be used as gas for drying, the dried sewage sludge is first burnt inperfectly in incomplete combustion incinerator C, then is burnt perfectly in complete combustion incinerator D, and the complete combustion gas only is discharged out after the said gas heats the gas which dries the sewage sludge in heat exchanger E.

The invented incinerator system for sewage sludge is a combustion apparatus which can eliminate any bad effect, even if sewage sludge is fed at random by supply means 1; sewage sludge first becomes dried, is fed to incomplete and complete incinerators C and D, is perfectly burnt by the complete combustion incinerator, in which the temperature is high enough to decompose any bad smell. As a result of the said two-step combustion, NOx and hexachrom oxide are far less generated, especially, if a constant rate fuel to burn the dried sewage sludge is provided to incomplete and complete combustion incinerators C and D to be always able to make constant combustion. Because the sludge's heating value can effectively be used, it is possible to decrease auxiliary fuel down to minimum limit.

The device to feed sewage sludge above mentioned has a problem in that sewage sludge is fed into drying furnace B as big blocks if means 1 as shown by FIG. 1 is provided, and these blocks may not be pulverized on the fluidized sand layer during a short time since sewage sludge is extremely viscous, and may be buried in the sand layer, and may be only hardly decomposed and dried.

Figure 2:
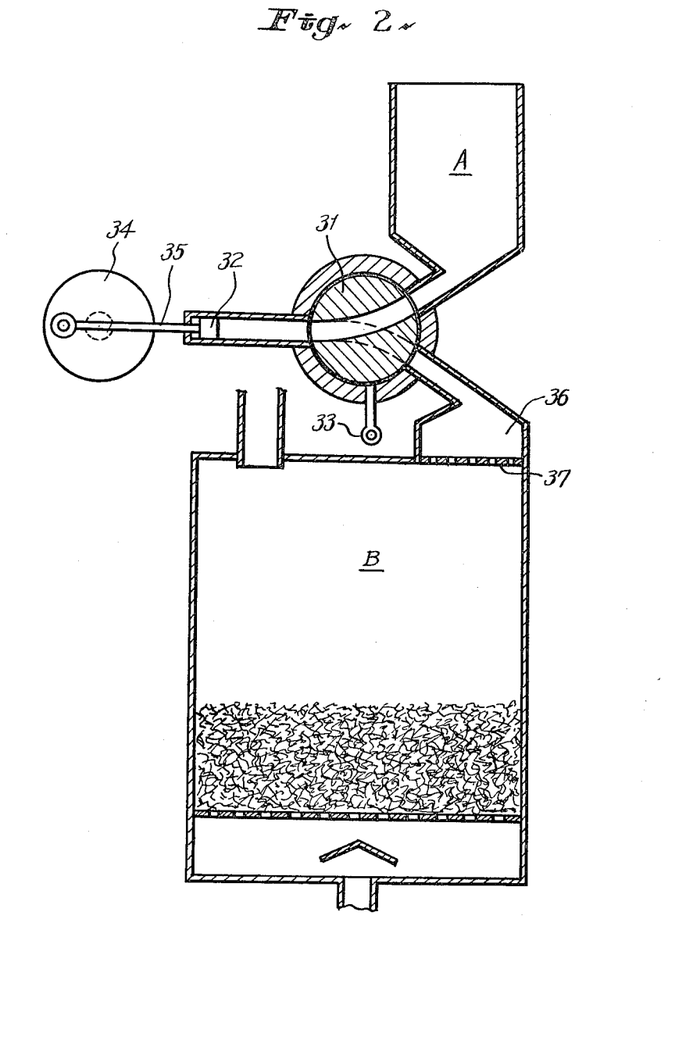
FIGS. 2 and 3 are the longitudinal side sectional drawing showing sewage sludge supply means by which suction and discharge are alternately carried out.
Figure 3:
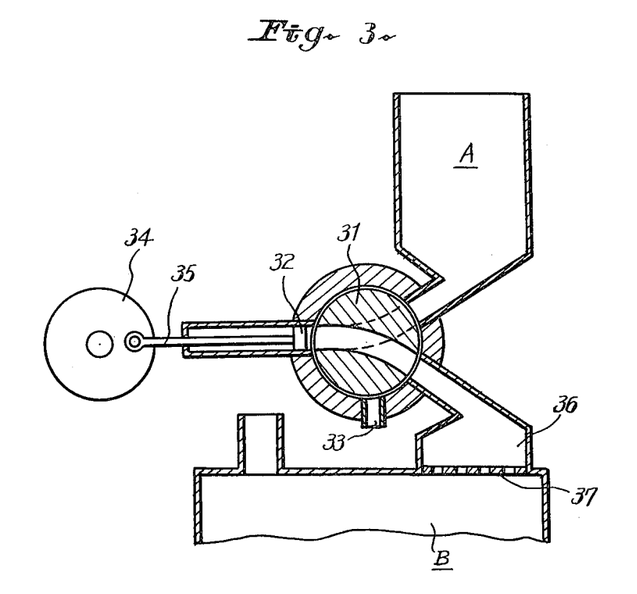
Figure 4:
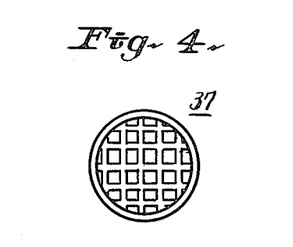
FIG. 4 gives the mesh body composing the bottom face of the discharge chamber.

The inventor has invented the supply means shown in FIGS. 2 through 6 and has applied this to Japanese Patent Office to be patented (dated May 7, 1980, No. Sho 55-027986). FIGS. 2, 3 and 4 show an embodied example of the supply means solving the problem above.

Sewage sludge is in hopper A, and a combined mechanism of ball valve 31 and piston 32 is mounted on the bottom of the said hopper A. Ball valve 31 and piston 32 are respectively operated with operation rod 33 and with crank 34 and connecting rod 35 and the both are operated synchronously.

FIG. 2 illustrates the sewage sludge in hopper A is being sucked as a bar by backstroke of piston 32, and FIG. 3 indicates the sewage sludge being expelled into discharge chamber 36 as a bar by forward stroke of piston 32. The said discharge chamber 36 is located on the top of drying chamber B having a fluidized sand bed, and the bottom plate of the said discharge chamber is perforated with a suitable mesh size as shown in FIG. 4. Thus, the barlike sewage sludge fed into the said discharge chamber 36 is dropped and supplied into drying furnace B from the ceiling thereof while becoming fine particles by passing through the meshed body composing the bottom plate of the said discharge chamber. Or else, though the sewage sludge is sometimes supplied as particles mutually adhered because of the viscous nature, these adhered ones are easily divided into fine particles on the fluidized sand bed; therefore can smoothly be dried in drying chamber B.

Figure 5:
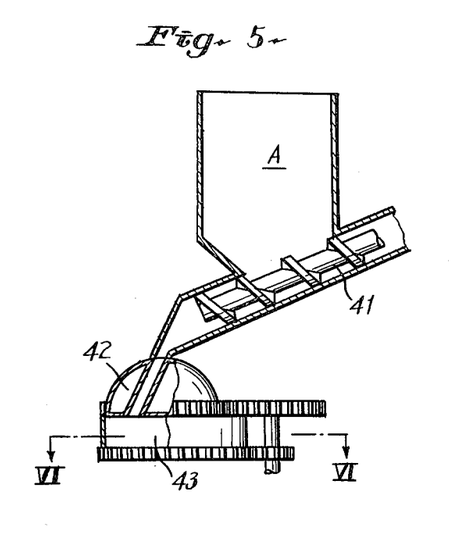
FIG. 5 is the longitudinal side sectional drawing showing the continuous bar-like sludge supply means.
Figure 6:
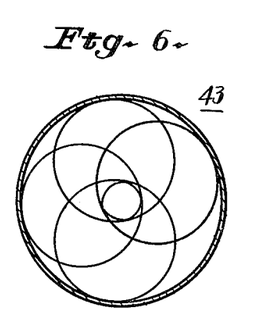
FIG. 6 is the VI—VI cross sectional drawing in FIG. 5.

The supply means given in FIGS. 2 and 3 is designed to suck sewage sludge and then to push it out into the discharge chamber alternately while it is turned as a bar, whereas FIGS. 5 and 6 show a means for taking out sewage sludge continuously as a bar.

Screw conveyor 41 is provided for the bottom of hopper A, and coiler head 42 having a slender tube and being rotatable is fitted to the tip of the conveyor housing; below that, discharge chamber 43, rotatable at a slow speed, is positioned on the top of drying chamber B and is provided with a mesh plate as a bottom plate thereof. Sewage sludge is continuously fed into the said discharge chamber 43 as a bar, and as a result, the sewage sludge is continuously fed from the top face of the discharge chamber, and the sewage sludge is supplied from the bottom thereof as fine particles into drying chamber B.

Figure 7:
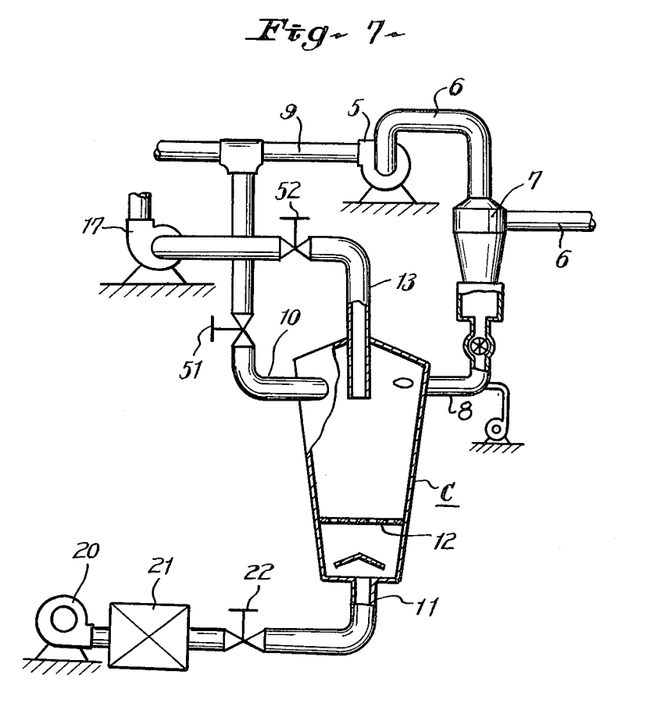
FIG. 7 is the longitudinal side sectional drawing of the incomplete combustion incinerator used for this invention and the piping around it.

The inventor has applied the incomplete combustion incinerator as shown in FIG. 7 to Japanese Patent Office to be patented (dated May 16, 1979; No. Sho 54-059072). FIG. 7 gives particularly the longitudinal side sectional drawing of incomplete combustion incinerator C and its surrounding piping.

The sewage sludge product yielded by the drying chamber with a fluidized sand bed is sucked and is transferred by feed pipe 6 having blower 5 by separation means 7 is provided for the said feed pipe, the separated solid is recovered in a chamber at the bottom of the said solid separation means, and a constant rate feed means 8 is mounted on the said bottom chamber, the constant rate feed means being so designed as to supply dried sewage sludge at a constant rate together with air at a small rate for blowing off, into incomplete combustion incinerator C while turning around the central axis at its upper section.

In addition, branch pipe 10 is mounted at the down stream of solid separation means connected with feed pipe 6 and blower 5. Adjusting valve 51 is mounted on the said branch pipe for supplying a portion of dried gas from gas feed pipe 6, suitably adjusted with adjusting valve 51 to incomplete combustion incinerator, by extracting it through branch pipe 10. Incomplete combustion incinerator C is designed so that the said gas is supplied while turning around the central axis at the upper section of incinerator C. Perforated plate 12 is set in the said incomplete combustion incinerator C. The combustion air comes from blower 20, passes air preheater 21, is preheated and is supplied to incomplete combustion incinerator C through control valve 22. The system is designed so that the preheated air is adjusted to 60–90% of the theoretical air rate required for burning the dried sewage sludge solid and dried sewage sludge gas and is supplied to incomplete combustion incinerator C from its bottom through preheated air feed pipe 11 having control valve 22 and through perforated plate 12 with even upward stream. The said incinerator C is also designed so that incomplete combustion is carried out smoothly in it and the incomplete combustion products yielded in the said incinerator C is sucked and discharged through feed pipe 13, the exit port of which is opened above the central axis at the upper section of the said incinerator C. The blower 17 is provided directly or indirectly for the said feed pipe 13 to be able to suck the incomplete combustion products smoothly, and adjusting valve 52 is mounted on feed pipe 13 so that a suitable rate of the incomplete combustion products can be taken out of incomplete combustion incinerator C and be supplied to complete combustion incinerator D.

Figure 8:
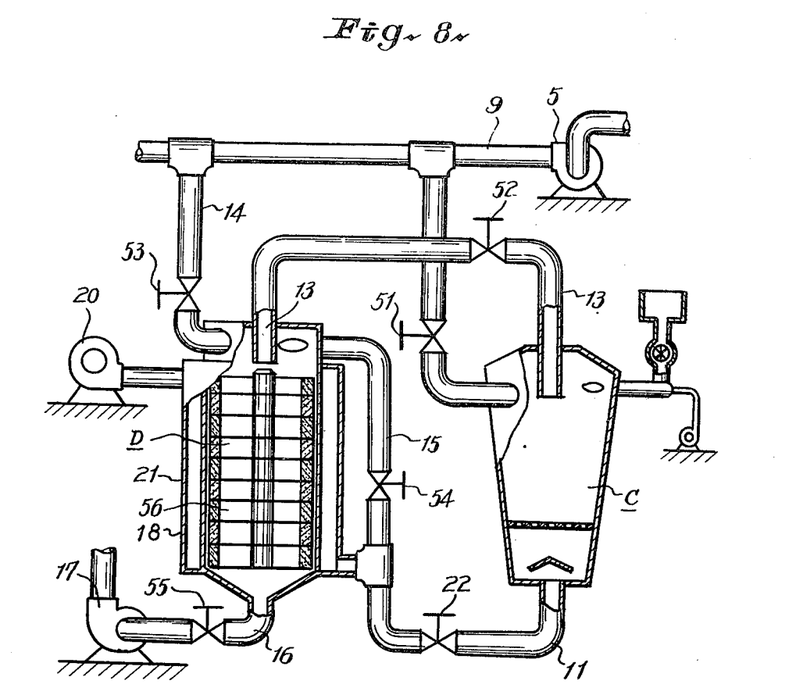
FIG. 8 is the longitudinal side sectional drawing of the complete combustion incinerator and the piping around it.
Figure 9:
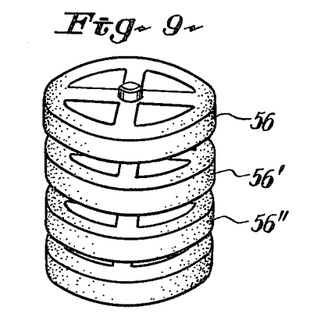
FIG. 9 is the bird-eye view of the refractory brick structure to be installed in the complete combustion incinerator.

The inventor has also applied the complete combustion incinerator shown in FIGS. 8 and 9 to Japanese Patent Office to be patented (dated May 16, 1979; No. Sho. 54-059073). FIG. 8 gives especially the longitudinal side sectional drawing of complete combustion incinerator D, and FIG. 9 shows one embodied construction of retractory brick structure to be installed in complete combustion incinerator D.

The incomplete combustion products yielded by incomplete combustion incinerator C are sucked and taken out through feed pipe 13 with adjusting valve 52 and are supplied to complete combustion incinerator D at an approximately constant rate downward from an opening at the top center. The branch pipe 14 is also provided for feed pipe 9, and adjusting valve 53 is mounted on the said branch pipe 14, so that a suitable portion of the dried gas of the sewage sludge is extracted from the feed pipe 9 and is supplied by the said branch pipe 14 to complete combustion incinerator D, turning around the central axis in the upper section of the said incinerator D. The combustion air passes the blower 20, is preheated through air preheater 21, which composes the jacket of the said complete combustion incinerator, a portion of the preheated air is sent to incinerator C, as the other portion is controlled so that it is supplied to the said complete combustion incinerator through preheated air feed pipe 15 having control valve 54. Its supply rate is sufficiently adjusted for burning the incomplete combustion products supplied to the said incinerator D and a portion of the dried gas and is supplied so as to turn around the central axis in the upper section of the said incinerator D. The refractory brick structures 56, 56' and 56" given in FIG. 9 are contained in the said complete combustion incinerator D and act so that the complete combustion is smoothly performed by reflected heat from the said refractory brick structures under the atmosphere about 800° C. in the incinerator. Before the complete combustion products are taken out, these products are adjusted in quantity so that only a suitable rate is sucked and discharged through exhaust pipe 16 having blower 17 by providing control valve 55 for the said discharge pipe.

A is the hopper, B is the drying furnace with a fluidized sand bed, C is the incomplete combustion incinerator, D is the complete combustion incinerator, E is the heat exchanger, 1 is the supply means, 2 is the fluidized sand bed, 3 is the perforated bed plate, 4 is the feed pipe, 5 is the blower, 6 is the feed pipe, 7 is the cyclone separator, 8 is the constant rate supply means, 9 is the feed pipe, 10 is the branch pipe, 11 is the preheated air feed pipe, 12 is the perforated plate, 13 is the feed pipe, 14 is the branch pipe, 15 is the preheated air feed pipe, 16 is the air feed pipe, 17 is the blower, 18 is the cyclone separator, 20 is the blower, 21 is the air preheater, 22 is the control valve, 31 is the ball valve, 32 is the piston, 33 is the operation rod, 34 is the crank, 35 is the connecting rod, 36 is the discharge chamber, 37 is the mesh body, 41 is the screw conveyor, 42 is the coiler head, 43 is the discharge chamber, 51, 52, 53, 54 and 55 are respectively the control or adjusting valves, and 56 is the refractory brick structures.

We claim:

1. An incineration system for sewage sludge dehydrated to about 70% of water content comprising
    a hopper for receiving said sludge,
    a drying furnace connected to said hopper by a supplying means for supplying said sludge from said hopper to said furnace, said furnace having a fluidized sand bed, whereby said sludge is dried to a solid component and a gaseous component,
    a circular circuit for said gaseous component comprising said drying furnace, a first feed pipe connected to said furance, a heat exchanger connected to said first feed pipe, and a second feed pipe connecting said heat exchanger and said furnace, including means for conveying said solid component along part of said circuit,
    a first incinerator connected to said circuit for receiving a portion of said gaseous component and said solid component, for incompletely combusting said components,
    means for supplying to said first incinerator preheated air in insufficient quantity to completely combust said components,
    a second incinerator connected to said first incinerator for receiving the products of said incomplete combustion and connected to said circuit for receiving another portion of said gaseous component, for completely combusting said gaseous portion and said products of incomplete combustion, and
    means for supplying to said second incinerator sufficient preheated air to completely combust said gaseous portion and said products of incomplete combustion, wherein said second incinerator has a discharge means connected to said heat exchanger for discharging the products of said complete combustion to said heat exchanger in which their temperature is reduced.

2. An incineration system as claimed in claim 1 wherein said supplying means comprises
    means for taking said sludge from said hopper in a bar-like shape and introducing said bar-like shaped sludge to a discharge chamber located on the top of said drying furnace, said discharge chamber having a mesh bottom of suitable mesh size,
whereby said sludge is introduced to said drying furnace through said mesh bottom.

3. An incineration system as claimed in claim 1 or 2 further comprising a separation means connected to said first feed pipe to separate said solid and gaseous components,
    a constant rate supply means connected between said separation means and said first incinerator for conveying said solid component from said separation means to said first incinerator and
    a branch pipe connected to said first pipe downstream of said separation means for feeding said portion of said gaseous component to said first incinerator,
    wherein the constant rate supply means and branch pipe feed their respective components into an upper section of said first incinerator while turning around the central axis of said first incinerator,
    and said means for supplying preheated air to said first incinerator supplies air at 60–90% of the theoretical rate to completely combust the solid and gaseous components fed into said first incinerator at a location at the bottom of said first incinerator,
    said first incinerator further comprising a perforated plate above the location where said air is supplied to allow said air to pass through said plate and flow evenly upward and to mix with and burn said solid and gaseous components, and a feed pipe connected to said second incinerator for conveying said products of said incomplete combustion to said second incinerator.

4. An incineration system as claimed in claim 1 or 2 further comprising
    an air preheater jacket around said second incinerator for preheating the air supplied to said first and second incinerators,
    a branch pipe connected to said first pipe for feeding said portion of said gaseous component to said second incinerator, wherein said branch pipe and said means supplying preheated air feed their respective materials into an upper section of said second incinerator while turning around the central axis of said second incinerator,
    wherein said second incinerator connection to said first incinerator for receiving the products of said incomplete combustion is located at the top center of said second incinerator for downward supply, said second incinerator has refractory brick structures within it, and said discharge means of said second incinerator in an exhaust pipe mounted on the bottom of said second incinerator connected to a blower for positive discharge.

5. An incineration system as claimed in claim 3 further comprising
    an air preheater jacket around said second incinerator for preheating the air supplied to said first and second incinerators,
    a branch pipe connected to said first pipe for feeding said portion of said gaseous component to said second incinerator, wherein said branch pipe and said means supplying preheated air feed their respective materials into an upper section of said second incinerator while turning around the central axis of said second incinerator,
    wherein said second incinerator connection to said first incinerator for receiving the products of said incomplete combustion is located at the top center of said second incinerator for downward supply, said second incinerator has refractory brick structures within it, and said discharge means of said second incinerator is an exhaust pipe mounted on the bottom of said second incinerator connected to a blower for positive discharge.

* * * * *